United States Patent [19]

Walker

[11] Patent Number: 4,602,206
[45] Date of Patent: Jul. 22, 1986

[54] CAPACITANCE CONTROL FOR A STATIC VAR GENERATOR

[75] Inventor: Loren H. Walker, Salem, Va.

[73] Assignee: General Electric Company, Salem, Va.

[21] Appl. No.: 508,711

[22] Filed: Jun. 28, 1983

[51] Int. Cl.[4] .............................................. H02J 3/18
[52] U.S. Cl. .................................... 323/211; 323/207
[58] Field of Search ......................... 323/207, 210, 211

[56]  References Cited
U.S. PATENT DOCUMENTS 4,348,631  9/1982  Gyugyi et al. ...................... 323/211

OTHER PUBLICATIONS

"Reactive Power Generation and Control by Thyristor Circuits" by Laszlo Gyugyi, IEEE Transactions on Industry Publications, vol. 1A-15, No. 5, Sep./Oct. 1979, pp. 521-532-see especially 524-525.

Primary Examiner—Patrick R. Salce
Assistant Examiner—D. L. Rebsch
Attorney, Agent, or Firm—Arnold E. Renner

[57]  ABSTRACT

Improved control of a var generator of the static type using thyristors wherein control is accomplished by generating a capacitance command representing the value of an equivalent capacitor, as opposed to a current command or a var command. The gating times or angles of the thyristors are determined by the capacitance command acting through an intermediate control which may be an open-loop feed-forward control or a closed loop feedback control operating in response to the difference between the capacitance command and a capacitance feedback, or a combination of both these types of control. The effect of the capacitance control is to provide an improved response of the var generator for changes in source voltage or frequency. The capacitance control also provides an improved linearity of control.

47 Claims, 4 Drawing Figures

CAPACITANCE CONTROL FOR A STATIC VAR GENERATOR

CROSS REFERENCE TO RELATED APPLICATIONS

This application is related to the following U.S. patent applications, which are assigned to the assignee of the present invention and which are hereby incorporated by reference:

U.S. Pat. No. 4,496,899, entitled "Control For A Force Commutated Current Source VAR Generator" issued Jan. 29, 1985, in the names of David L. Lippitt and Loren H. Walker; and U.S. patent application Ser. No. 508,712 entitled, "Thyristor Voltage Limiter For A Current Source Inverter", filed on June 28, 1983, in the name of Loren H. Walker.

BACKGROUND OF THE INVENTION

This invention relates generally to a method and means for controlling the power factor, the phase angle between current and voltage, of alternating current (AC) transmission lines supplying power to a time varying load and more particularly to a static var (volt-amperes reactive) generator which functions as a variable reactance utilized for load compensation and power factor correction on such transmission lines.

While rotating synchronous condensers and banks of mechanically switched fixed capacitors or inductors have been used in the past for var compensation and power factor correction, recent advances in high power thyristor technology have resulted in the development of controllable static var sources, commonly referred to as var generators. One known general class of var generators, known as current source var generators, comprises a six pulse AC to DC (direct current) converter with the AC terminals connected to the AC transmission lines and the DC terminals shorted through a DC inductor. A particular type of that class utilizes for its six pulse AC to DC converter the inverter section of a controlled current inverter (CCI).

As disclosed in a publication entitled, "Reactive Power Generation And Control By Thyristor Circuits" by Laszlo Gyugyi, which appeared in the *IEEE Transactions On Industry Applications*, Vol. 1A-15, No. 5, September/October, 1979, pp. 521–532, a current source inverter utilized as a var generator may be either naturally commutated or force commutated. The naturally commutated inverter can only provide lagging vars, while the force commutated inverter can provide both lagering and leading vars. A naturally commutated inverter is comprises a simple bridge of six thyristors, while a force commutated inverter includes a bridge of six thyristors, series connected diodes and cross coupling capacitors, both circuits being well known to those skilled in the art. A naturally commutated inverter can operate only when the thyristors are fired at such delay angles where the DC current is naturally transferred from one pair of thyristors to the next and thus operates as a controllable rectifier where the delay angle of thyristor firing is restricted to the range of 0° to 180°. By gating the thyristors near 90° lagging; that is, where the AC current lags the voltage by 90°; a voltage of nearly zero volts DC will be generated and the current in the inductor can be controlled by slight changes (advances) in gating angle. Accordingly, the circuit appears as a continuously variable balanced three phase inductor across the AC line, a source of controllable lagging vars.

In the force commutated inverter configuration, however, the thyristors act like gate turn-off devices capable of being operated over the total firing angle range of 0°–360° and can thus provide both leading and lagging line currents and, accordingly, can selectively act both as a variable balanced three phase capacitor or inductor.

While it is possible to control a force commutated thyristor bridge as a current source var generator (CSVG) in both leading and lagging quadrants, it inherently exhibits a control characteristic which is highly non-linear, includes very large and variable transport delay, and has different control characteristics in leading operation as opposed to lagging operation.

SUMMARY OF THE INVENTION

It is, therefore, an object of the present invention to provide an improvement in var generators and their method of operation.

It is a further object to provide an improvement in the control of current source var generators.

It is another object of the invention to provide a linear control of a current source var generator while operating in both leading and lagging quadrants.

It is still a further object of the invention to provide a current source var generator which exhibits a linear control characteristic with uniform dynamic response.

It is still another object of the invention to provide a current source var generator which exhibits a linearly uniform dynamic response over the entire range of loads from high lagging vars through zero to high leading vars.

It is still a further object of the present invention to provide a var generator whose control characteristics are uniform for changes in line voltage or frequency.

It is still a further object of the invention to provide a var generator which appears transiently as a positive or negative capacitor on the power source.

The foregoing and other objects are achieved by recognizing the fact that the control characteristic of a var generator comprising a force commutated current source inverter including a thyristor bridge is substantially non-linear. This non-linearity involves a wide range of gain in vars as a function of gating angle. A negative feedback regulator cannot provide both stability and satisfactory regulation of the var generator over a range of operating points where the basic system gains vary so widely. The met a apparatus described with respect to the aforementioned Pat. No. 4,496,899 provides satisfactory control of the var generator by establishing a static operating point of the generator by a feed-forward function generator which models the system noh-linearities, and then combining this with a conventional negative feedback regulator which controls the dynamic operation and corrects for errors between the feed-forward model and the true system being controlled. Improved transient response is achieved by driving the feedforward function by a summation of a var command signal and var feedback signal indicative of the present level of vars. Similar dynamic response in both leading and lagging operation is thus provided. The present invention is directed to a further improvement in var generators which causes the non-linear model to remain valid as a function of frequency and line voltage magnitude and comprises generating and substituting a capitance command and a capacitance feedback for the var command and the var feedback signals.

BRIEF DESCRIPTION OF THE DRAWINGS

While the present invention is defined in the claims annexed to and forming a part of this specification, a better understanding can be had by reference to the following description when taken in conjunction with the accompanying drawings in which:

DETAILED DESCRIPTION

Figure 1:
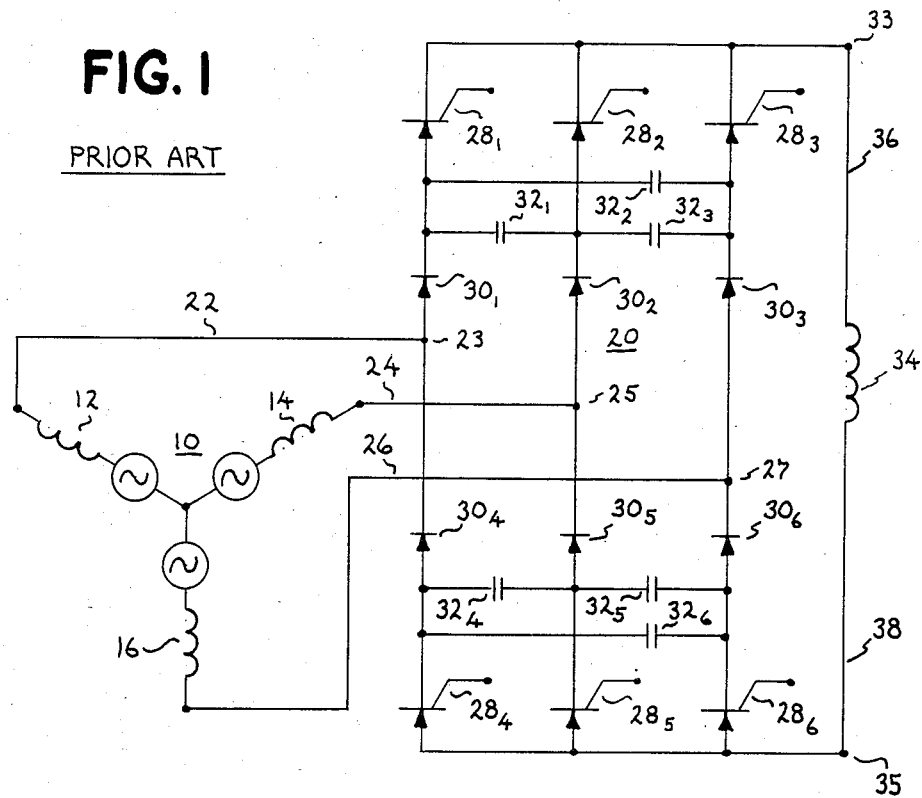
FIG. 1 is an electrical schematic diagram of a force commutated current source var generator in accordance with the known prior art.

Referring now to the drawings and more particularly to FIG. 1, referency numeral 10 denotes a three phase (3φ) alternating current (AC) power source, including local inductive reactances 12, 14 and 16, coupled to a force commutated current source AC to DC inverter (CCI) 20 by means of AC power lines 22, 24 and 26 connected to AC terminals 23, 25 and 27. The current source inverter 20 comprises a force commutated thyristor bridge, well known to those skilled in the art, including six thyristors $28_1$, $28_2$ ... $28_6$, respectively series connected diodes $30_1$ $30_2$ ... $30_6$ and six cross-coupling capacitors $32_1$, $32_2$ ... $32_6$. Further, as shown in FIG. 1, an inductor 34 is connected across DC output terminals 33 and 35 of the thyristor bridge by means of circuit leads 36 and 38. A thyristor gating or "firing" circuit, not shown, is adapted to be connected to the respective gate electrodes of each of the thyristors $28_1$, $28_2$ ... $28_6$ for sequentially firing the thyristors at a predetermined delay angle α, measured from the earliest point of natural commutation, and which comprises the zero crossing points of the line-to-line voltages in a three phase AC system.

Further as is well known, the force commutated current source inverter 20, being inductively loaded by the inductor 34, provides a var generator which is adapted to provide either lagging or leading vars (reactive volt-amperes) to compensate for a mutually opposite type of load reactance of a load impedance, not shown, connected to the AC source 10. Such a load impedance typically comprises relatively large lagging (inductive) loads such as electrical machines and line commutated thyristor motor drives. By supplying a reactive power component (vars) substantially equal to and opposite the reactive component of the load, a tuned system is provided which appears substantially as a resistive AC impedance operating to provide a maximum power transfer to the load. The var generator may be controlled to provide strategies other than unity power factor; for example, a strategy for minimum voltage disturbance due to the varying load.

Figure 2:
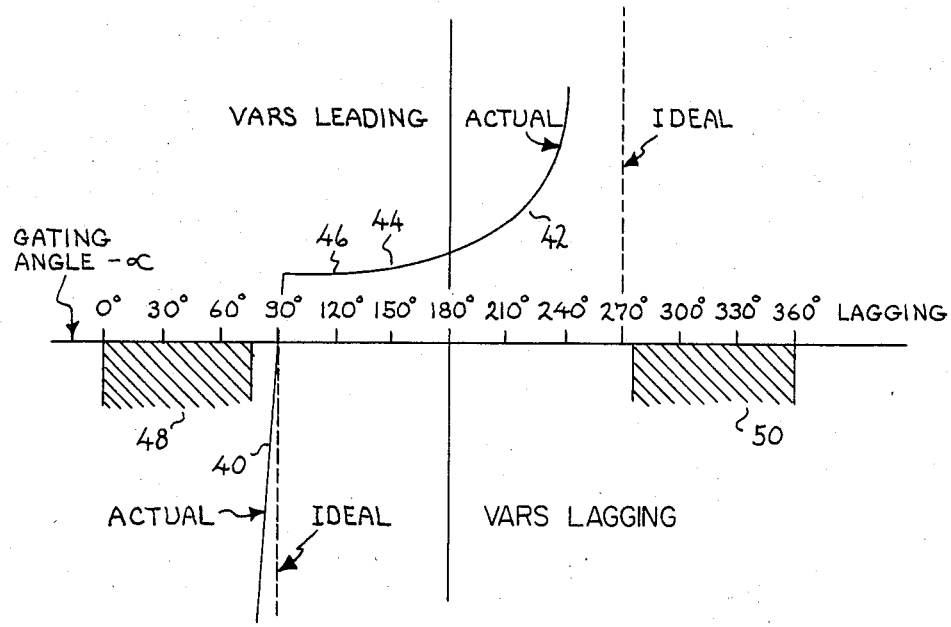
FIG. 2 is a graph illustrative of the control characteristic of a force commutated current source var generator such as shown in FIG. 1.

The var generator 20 shown in FIG. 1 has an operational characteristic such as is illustrated in FIG. 2. This characteristic is shown by a graph depicting the relationship between vars, both lagging and leading, versus the firing delay; i.e. the lagging gate angle α of the thyristors $28_1$ ... $28_6$. This characteristic can be explained in the following manner. If the circuit configuration of FIG. 1 were a simple bridge of the six thyristors without the series diodes and commutating capacitors, it would simply operate as a controllable rectifier which provides a DC voltage across the inductor 34 which is controllable by varying the delay in gating the thyristors. By gating the thyristors near 90° lagging, i.e., where the current lags the line voltage, a voltage of nearly zero volts DC will be generated and the DC current in the inductor 34 can be controlled by slight changes, such as advances, in gating angle as shown by the linear portion 40 of the characteristic curve shown. With the diodes $30_1$ ... $30_6$ and the capacitors $32_1$ ... $32_6$ being included, however, a turn off capability for the thyristors $28_1$ ... $28_6$ is provided which permits gating over the total firing angle range of 0°-360° and thus a source of leading vars is obtainable. Accordingly, if the gating is changed to 90° leading, which is equivalent to and thus corresponds to 270° lagging of FIG. 2, the DC output voltage will be zero as it is at 90° lagging. The current level in the inductor will still be controllable by the choice of gating angle, but an advancement of the gating angle; i.e., backing off from 270° will decrease the current according to the non-linear characteristic portion 42 of the actual characteristic shown in FIG. 2. This non-linear leading characteristic 42 is determined by the time it takes to reverse the voltage on the particular commutating capacitor each time a thyristor is gated on in leading operation. This time is typically 30° at maximum DC current at 60 Hz. This time, moreover, is the delay between gating a thyristor and the initiation of current in the corresponding series diode. In order to draw current from the AC line, the diodes must begin conduction at 90° leading, or 270° as shown in FIG. 2. Thus at maximum leading vars, the thyristors are gated at α=240° lagging, which is 30° ahead of 270° lagging; i.e., 90° leading.

The delay between thyristor and diode commutation is approximately proportional to the reciprocal of DC current. This characteristic applies until a current is reached at which the delay in diode conduction is 120°, which exists where gating the thyristors occurs at 270°−120°=150° and which occurs at point 44 of the characteristic curve shown in FIG. 2. Current refuses to decrease below this minimum level, even though gating angle is changed towards 90°, as evidenced by the portion 46 of the characteristic curve, due to the existence of the commutating capacitance. The value of the minimum current is given by the expression:

$$I_{dc}(min) = V_S \sqrt{2}\ \omega\ \frac{3}{2}\ C_\Delta \qquad (1)$$

where $V_S\sqrt{2}$ is the peak line-to-line source voltage, ω is the source frequency in radians per second, and $C_\Delta$ is the capacitance of one of the commutating capacitors $32_1$ ... $32_6$.

When the gating is advanced further, approaching 90° lagging (FIG. 2), the conduction periods of the diodes $30_1$ ... $30_6$ overlap until five of the six diodes are in conduction at all times and the capacitors $32_1$ ... $32_6$ cease to act as commutating capacitors, thus giving rise to the controllable rectifier operation referred to above. The conducting diodes connect the capacitors directly across the AC source 10 and the thyristors 28₁ ... 28₆ to freely pass DC current to the inductor 34, giving rise to the linear characteristic portion 40 of the curve. The gating angle regions 48 and 50 denote excess current regions which are not utilized because they cause a large positive DC voltage across the inductor, and thus cause excessive DC current.

Figure 3:
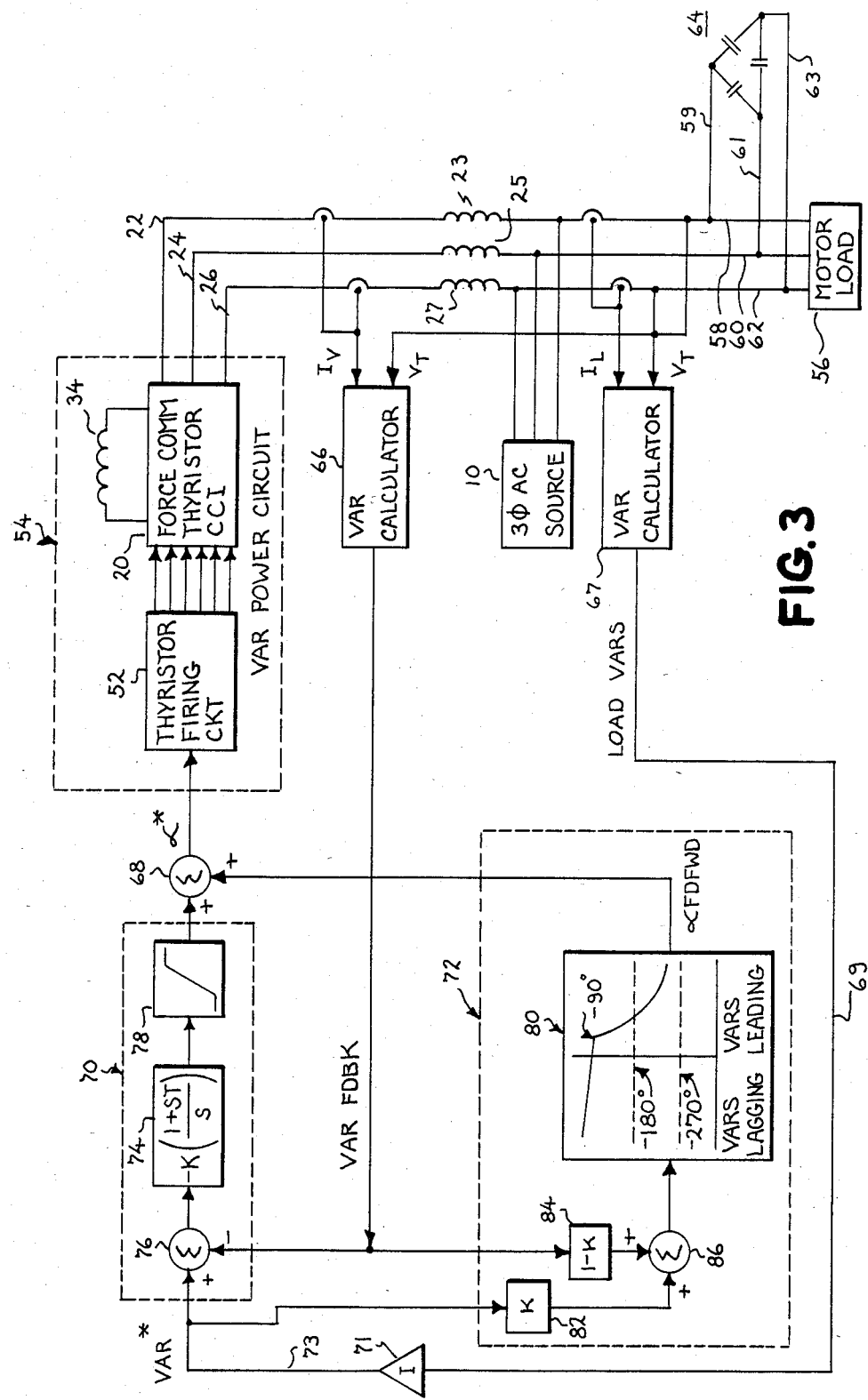
FIG. 3 is an electrical block diagram generally illustrative of an embodiment of a circuit for linearizing the control of the current source shown in FIG. 1.

Referring now to FIG. 3, shown is a means for converting the operation of the current source var generator 20 of FIG. 1, and having a characteristic as shown in FIG. 2, into a var generator having a substantially linear uniform dynamic response, while generating both lagging and leading vars. The force commutated current source inverter (CCI) 20 (FIG. 1) is shown in FIG. 3 coupled to a thyristor firing circuit 52, forming thereby a var power circuit 54 which is coupled to the three phase AC source 10 by means of the power lines 22, 24 and 26 and isolating reactors 23, 25, 27. The AC source 10 is further shown coupled to a load 56 comprising, for example, a motor load via the three phase supply lines 58, 60 and 62, and a fixed capacitor bank 64 connected to the motor load terminals via power lines 59, 61 and 63. The fixed capacitor bank 64 serves to partially correct or compensate for the inductance of the load.

Since a motor load has a reactance characteristic which fluctuates over a relatively wide range during its operation, a variable source of compensation is needed and is provided by the CCI var generator 20. The var generator 20 is controlled by a firing angle command signal $\alpha^*$ generated in response to a var command signal (VAR*) and a var feedback signal (VAR FDBK).

The var command (VAR*) can be generated as shown in FIG. 3 to implement a unity power factor control. Var calculator means 67 senses two currents $I_L$ and two line voltages $V_T$ to calculate the total reactive volt-amperes in the load and capacitor bank in a manner substantially like a conventional two watt-meter arrangement. This signal LOAD VARS appears on line 69. It is inverted by inverter 71 and applied as the VAR* signal to the var generator on line 73. By commanding the var generator to produce vars which are the negative of those in the load and capacitors, a net zero vars will be drawn from the AC source 10, and the load will appear as unity power factor.

The VAR FDBK signal is generated by a var calculator circuit 66, which can be configured identically to var calculator 67, and senses two of the line currents $I_V$ and two of the line voltages $V_T$ appearing, for example, on lines 22 and 26 of the AC power line connecting the current source converter 20 to the AC source 10. When desirable, an electronic meter circuit configuration may be utilized.

The firing angle command signal $\alpha^*$ is shown in FIG. 3 comprising the summation of two alpha ($\alpha$) signals applied to a summing junction 68, the first signal being generated by a linear feedback control circuit 70 while the second signal is generated by a non-linear feedforward control circuit 72. The feedback circuit 70 is operable to essentially control the generation of its firing angle $\alpha$ in response to the error between a var command VAR* and a var feedback VAR FDBK signal whereas the feed-forward circuit 72 is operable to essentially control the generation of its control signal $\alpha$ in response to the sum of the VAR* and VAR FDBK signals.

As is shown in FIG. 2, the control characteristic for lagging vars is substantially linear, whereas the control characteristic for leading vars is non-linear. Accordingly, the linear feedback circuit 70 includes a linear regulator circuit 74 having an input signal which is the difference or error signal between the var command signal VAR* and the var feedback signal VAR FDBK and comprises the output of a summing junction 76 to which these signals are applied. The regulator 74 is shown being a proportional plus integral type controller comprising, for example, operational amplifier configured to operate as a gain amplifier having a transfer function of $$-K\left(\frac{1 + ST}{S}\right),$$

where S is a LaPlace operator, T is a time constant, and K is a gain constant. This amplifier, when desirable, could also have a simple gain. The output of the regulator 74 is fed to a signal clamp 78 which limits the variable output of the regulator 74.

The feed-forward circuit 72 includes a non-linear active network which is designed to have a signal transfer function which matches the actual static characteristic of FIG. 2, that is, being responsive primarily to the var command signal VAR*. Blocks 82 and 84 represent signal translation devices having a gain signal transfer function given by K and 1−K, respectively, where K ranges between 0.5 and 1.0. If K is equal to unity, then the function of block 72 would be to provide to summing junction 68 the proper value of gating angle alpha corresponding to the var command. Thus the feedback network 70 would provide the dynamic forcing and precise error correction to the value of alpha, while the feed-forward network 80 provides the static set point.

In order to maintain similar dynamic response in both leading and lagging operation, it is necessary to restrict the dynamic operation of the non-linear network 80 inasmuch as the transfer function includes a very high gain region near zero vars in the leading quadrant. This high gain can provide relatively high angle commands for small changes in var command in this region. This effect is offset by supplying an input signal to the network 80 partly comprising the var command signal VAR* which is coupled thereto by signal scaling circuit element 82 and partly the var feedback signal, VAR FDBK, which is applied by signal scaling circuit element 84 with the scale factors or gains of the two circuit elements 82 and 84 being selected to have a sum equal to unity by being equal to K and 1−K, respectively. As shown in FIG. 3, the two circuit elements 82 and 84 are coupled to a summing junction 86 which generates a composite drive signal which is then coupled to the input of the non-linear network 80.

Thus, in steady state when the var command signal VAR* and the var feedback signal VAR FDBK are substantially alike, the composite input signal to the network 80 is equal to the operating point dictated by the signal VAR* and the output therefrom is set at the appropriate firing angle command $\alpha^*$. When the var command signal VAR* moves dynamically and the var generator 20 has not as yet responded, the forcing function provided by the non-linear network 80 is reduced by the factor K. By setting the scaling factors of K and 1−K at the proper magnitudes, typically K=0.75 and 1−K=0.25, the transient response in leading operation can be made similar to that lagging operation so that the overall transient response is substantially uniform at all operating points.

It should be noted that the control provided by the combination of the linear feedback circuit 70 and the non-linear feed-forward circuit 72 results in a regulation of reactive volt-amperes (vars) rather than DC current. If DC current through the inductor 34 were regulated, the control of the subject invention would have to have a reversal of sense at the transition from leading to lagging operation and thus would be difficult to operate at zero vars. Furthermore, the use of a combination of non-linear feed-forward control and linear feedback control provides a precise control that is fast responding, linear and stable.

When the load 56, connected to the three phase AC source 10, comprises an inductive load such as a motor, the question arises as to the need for both lagging and leading var generation for compensation since a motor load comprises an inductive reactance load impedance which primarily requires leading var compensation. It should be pointed out, however, that the fixed compensating capacitance 64, coupled across the load 56, itself requires compensation when the load 56 becomes ineffective and virtually disappears so that the AC source 10 becomes effectively capacitively loaded, requiring lagging var compensation. Thus with the control configuration disclosed in FIG. 3, a linear control is provided over the entire range of loads from high lagging vars through zero to high leading vars.

The var generator of FIG. 1 has an inherent characteristic in that at a fixed value of alpha its var output is a linear function of frequency and a squared function of voltage magnitude, and thus when line voltage or frequency is varied, the non-linear network 80 of FIG. 3 does not generate a correct value for the gating angle command signal $\alpha^*$ as a function of var command signal. To this end, reference will now be made to FIG. 4 which discloses an improvement in the control of the var power circuit 54 so that its non-linear compensation remains constant; i.e., requiring no change of firing angle, when source line voltage or frequency changes.

It can be observed that the operational characteristic of the current source var generator in leading operation, at a fixed gating angle $\alpha$, are those of a fixed capacitor. As is well known, the magnitude of the current I drawn from an AC source by a capacitor is:

$$I = V/X_c = V\omega C \quad (2)$$

where V is the source voltage, $X_c$ is the capacitive reactance and equal to $1/\omega C$, C is the capacitance, $\omega$ is equal to $2\pi f$, and f is the source frequency. Furthermore, the reactive volt-amperes or vars drawn by the capacitor C is leading and can be expressed by a signal VAR as:

$$VAR = V \times I = V^2 \omega C \quad (3)$$

Accordingly, if a source of leading vars, such as that shown in FIG. 1, were to be dimensioned in terms of an equivalent capacitor, which in fact it is not, then the equivalent capacitance C would be expressed by the equation:

$$C = VAR/V^2\omega \quad (4)$$

Equations (3) and (4) describe not only the capacitor, but the inherent characteristic of a current source var generator with fixed gating angle. Since the inherent characteristic of the current source var generator 20 in leading var operation is to act not as a fixed source of vars, but as a fixed capacitor, then if the thyristor firing circuit 52 shown in FIG. 3 were driven such that it receives a capacitance command signal C* instead of a var command signal VAR* for control of the delay of the inverter thyristor firing angle $\alpha$, and regulated with a capacitance type feedback signal $C_V$, for example, then its response to changes of voltage and frequency will be constant with respect to its command and will provide the required var compensation for line voltage changes without a change in gating angle and its non-linear network 80, acting to provide the primary control for the angle command signal $\alpha^*$ in leading operation, will still provide a valid model of the var generator 20 at all values of line voltage and line frequency.

Figure 4:
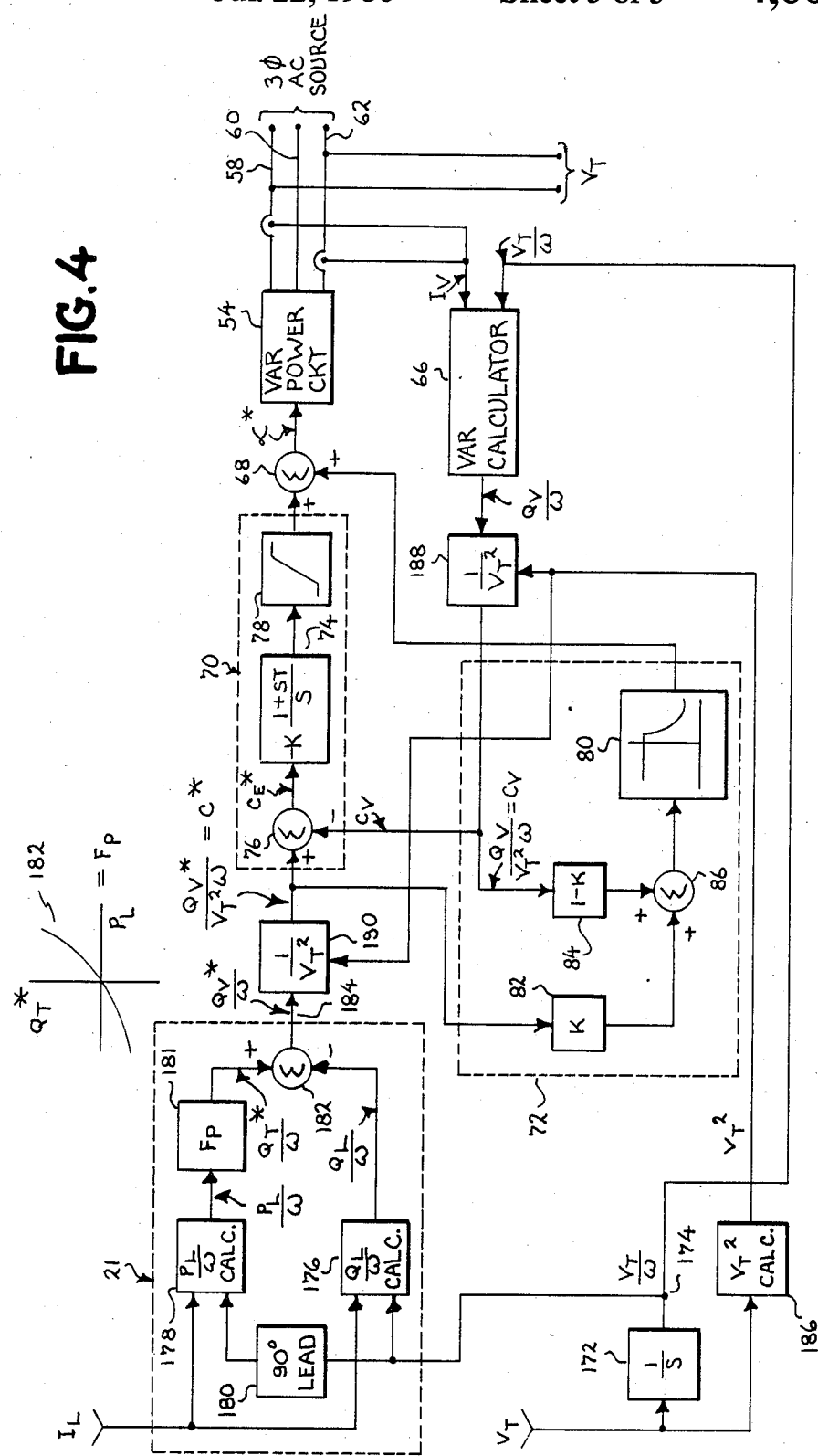
FIG. 4 is an electrical block diagram of the preferred embodiment of capacitance type control circuitry in accordance with the present invention for controlling the var generator shown in FIG. 1.

Referring now to FIG. 4, there is illustrated an improved control of the system shown in FIG. 3.

The improvement comprises the inclusion of a var command generator and capacitance control means now to be described. Whereas the var command generating means of FIG. 3 tends to maintain a constant power factor, the var command generator circuit block 21 of FIG. 4 causes the var generator to maintain constant line voltage rather than constant power factor. Further, the capacitance control elements identified by functional blocks 172, 186, 188 and 190 maintain the control characteristics of the var generator; i.e., the var power circuit 54 substantially constant as a function of both line voltage and frequency.

As shown, the var command generating means 21 of FIG. 4 replaces elements 67 and 71 of FIG. 3. The var calculator 176 of FIG. 4 serves the same function as the var calculator 67 of FIG. 3. However, the power calculator 178, the phase shifter 180 and the non-linear transfer function block 181, as well as the summing junction 182, are combined with var calculator 176 to provide a var command signal on signal lead 184 which acts to cause constant line voltage at $V_T$, undisturbed by the load, not shown, but which corresponds to the load 56 of FIG. 3. Considering now FIG. 4 in greater detail, first an integrator 172, having a transfer function of 1/S, (S is a LaPlace operator), is coupled to the source voltage $V_T$ of the AC source 10 which exists across the power lines 58, 60 and 62. The integrator 172 operates to smooth the AC voltage wave, shifts its phase by 90° lagging and causes an output voltage $V_T/\omega$ to be provided, having an amplitude which is proportional to the reciprocal of frequency since $\omega = 2\pi f$. This voltage, $V_T/\omega$, which appears at circuit junction 174 is applied to the var calculator 66 instead of the heretofore voltage $V_T$ as shown in FIG. 3. Additionally, the $V_T/\omega$ output of the integrator 172 is fed to a second var calculator circuit 176 and also to a power calculator circuit 178 after having been fed through a 90° leading phase shifter 180 which counteracts the lagging 90° phase shift provided by the integrator 172 so that the load current $I_L$ and the $V_T/\omega$ are again in phase. Both the var calculator 176 and the power calculator 178 have an input signal applied thereto corresponding to the load current $I_L$, developed as shown in FIG. 3, and comprise multiplier circuits which may be configured in any convenient manner. Specifically these calculators may be polyphase rather than single phase as shown. Since the output of the integrator 172 has an output which is proportional to the reciprocal of frequency, the output of the var calculator circuits 66 and 176 and the power calculator circuit 178 will be in terms of vars/$\omega$ and watts/$\omega$, respectively. The output of the power calculator 178 is next fed to a network 181 which has a non-linear transfer function $F_p$, as shown, for converting power $P_L$ to an equivalent reactive power $Q_T$ to provide a var command signal in terms of $Q^*_T/\omega$. This signal is applied to a summing junction 182 and differenced with the output $Q_L/\omega$ of the var calculator 176 which in effect provides a var signal of the load 56 and capacitors 64, shown in FIG. 3, so that a var command error signal $Q^*_V/\omega$ appears on signal line 184.

Further as shown in FIG. 4, a signal $V_T$ corresponding to the line-to-line source voltage appearing on the AC power lines 58 and 62 is applied to a squaring circuit 186, typically a multiplier, which provides an output signal corresponding to the square of the source voltage, i.e., $V^2_T$. This multiplier 186 may accept a polyphase input voltage $V_T$ rather than single phase as shown. This signal $V^2_T$ is commonly coupled to two circuits 188 and 190, which are respectively coupled to the var calculator circuit 66 and the summing junction 182 and which are typically analog divider circuits to implement the inverse function $1/V^2_T$. Whereas the var calculator circuit 66 performs a reactive voltage ampere calculation with an input of $V_T/\omega$ to provide an output in terms of vars/$\omega$, the transfer function of the circuit 188 coupled to the var calculator 66 converts the var feedback signal to a capacitance feedback signal $C_V$ since it comprises a signal equal to $Q_V/V^{2\omega}$, which signal corresponds to equation (4). Thus a feedback signal is applied to summing junction 76 and to scaling circuit 84 which comprises a capacitance signal rather than a reactive volt-ampere (vars) signal. Similarly, the circuit 190 converts the var command signal $Q^*_V/\omega$ to a capacitance command signal $C^*$ by multiplying it by $1/V^2_T$ to generate a signal of $Q^*_V/V^2_T\omega$. A capacitance difference signal $C^*_E$ from the summing junction 76 is now applied to the linear regulator circuit 74 described with reference to FIG. 3 and operation proceeds in both the leading and lagging quadrants as explained before. Thus if the task of the var generator 20 is to tune out the fixed capacitor 64, then the natural characteristics of the var controller shown in FIG. 4 are ideal since it will act as a negative capacitor and track the natural characteristics of the fixed capacitor as either source voltage or source frequency changes. It should also be noted that a fixed inductor will tune a fixed capacitor as voltage varies but not as frequency varies. However, a negative capacitor, as effectively generated in the circuitry of FIG. 4, tunes a fixed capacitor at all voltages and frequencies. Additionally, if it is the task of the var generator to compensate for the reactive current of a phase controller motor drive, for example, its characteristics as a positive capacitor are not exactly ideal but are nevertheless in the correct sense to provide correct compensation as source voltage varies, since at a given speed and torque, the drive draws a lagging reactive current which increases with line voltage, and the simulated capacitance draws a leading current which varies similarly. This is true whether the drive is motoring or regenerating, and is independent of the operating speed. But, the rate of change of reactive current with respect to voltage change is highly variable. Hence, the natural characteristic of the artificial capacitance as provided for in the circuit configuration of FIG. 4 provides a highly desirable means of controlling the var generator to provide a natural compensation for the variation of the load as source voltage or frequency varies.

While there have been shown and described what is are present considered to be the preferred embodiments of the invention, it is evident that this control could, when desirable, be implemented in a digital computing controller. This and other modifications thereto will readily occur to those skilled in the art. It is not desired, therefore, that the invention be limited to the specific arrangements shown and described, but it is intended to cover in the appended claims all such modifications as fall within the true spirit and scope of the invention.

I claim:

1. A control circuit for a static var generator comprising:
   (a) a var generator comprising a force commutated inverter including a plurality of controlled rectifiers coupled to an alternating current source;
   (b) means responsive to a gating angle command signal for controlling the firing angle of said controlled rectifiers for generating vars;
   (c) means for establishing a capacitance command signal representing the value of an equivalent capacitor required at the existing voltage and frequency of said alternating current source to provide a desired level of compensation; and
   (d) control means coupled to and responsive to said capacitance command signal for generating said gating angle command signal.

2. The control circuit of claim 1 and further comprising:
   (e) means for establishing another capacitance signal corresponding to the effective capacitance of said var generator and said alternating current source; and
   wherein said control means (d) is responsive to both said capacitance command signal and said another capacitance signal for generating said gating angle command signal.

3. The control circuit of claim 1 wherein said plurality of controlled rectifiers comprise thyristors and said var generator (a) includes means to inductively load said force commutated thyristor inverter to effect a predetermined operating characteristic,
   wherein said means (c) for establishing a capacitance command signal comprises,
   (i) means for establishing a var command signal corresponding to a command for vars; and
   (ii) means for converting said var command signal to said capacitance command signal; and
   wherein said control means (d) has a signal transfer function which models at least a portion of the operating characteristic of said var generator.

4. The control circuit of claim 1 wherein the controlled rectifiers of said inverter comprise thyristors.

5. The control circuit of claim 1 wherein said alternating current source supplies current and voltage to a load;
   wherein said plurality of controlled rectifiers of said var generator (a) comprise a plurality of thyristors; and
   wherein said means (c) for establishing a capacitance command signal comprises:
   (i) means for providing a current signal $I_L$ proportional to the current supplied to the load;
   (ii) means for providing a voltage signal $V_T$ proportional to the voltage supplied to the load;
   (iii) means for converting said voltage signal $V_T$ to a frequency related voltage signal $V_T/\omega$ where $\omega = 2\pi f$ and f corresponds to source frequency;

(iv) means coupled to said current signal and said frequency related voltage signal for generating a var command signal; and
(v) means coupled to said means for generating vars for converting said var command signal to said capacitance command signal.

6. The control circuit of claim 1 wherein said var generator (a) includes means to inductively load said force commutated inverter, said inverter thereby operating as a current source var generator.

7. The control circuit of claim 6 wherein the controlled rectifiers of said inverter comprise thyristors.

8. The control circuit of claim 6 and further comprising:
(e) means for establishing a capacitance signal corresponding to the effective capacitance of the inductively loaded force commutated inverter on said alternating current source; and
wherein said control means (d) is responsive to a combination of both said capacitance signals for generating said gating angle command signal.

9. The control circuit of claim 1 wherein said var generator (a) comprises a thyristor inverter having both leading and lagging modes of operation for generating leading and lagging vars.

10. The control circuit of claim 9 and further comprising:
(e) means for establishing a capacitance feedback signal corresponding to the effective capacitance of said inverter on said alternating current source; and
wherein said control means (d) is responsive to said capacitance command signal and said capacitance feedback signal for generating said gating angle command signal.

11. The control circuit of claim 4 wherein said var generator (a) includes means to inductively load the force commutated thyristor inverter to effect operation thereof as a current source var generator having a predetermined operational characteristic; and
wherein said control means (d) has a signal transfer function which models at least a portion of said operational characteristic of said var generator.

12. The control circuit of claim 11 wherein said control means (d) has a signal transfer function which models substantially all of the operational characteristic of said var generator.

13. The control circuit of claim 11 wherein said operational characteristic of said var generator (a) is generally non-linear and wherein said signal transfer function of said control means (d) comprises a non-linear transfer function.

14. The control circuit of claim 4 wherein said var generator (a) includes means to inductively load the force commutated thyristor inverter to effect a non-linear operating characteristic thereof; and,
wherein said control means (d) has a signal transfer function which models at least a portion of the non-linear operating characteristic of said inverter; and further comprising:
(e) means for establishing a capacitive feedback signal corresponding to the effective capacitance of said inverter on said alternating current source; and
wherein said control means (d) is responsive to both said capacitance command signal and said capacitance feedback signal for generating said gating angle command signal.

15. The control circuit of claim 14 and further comprising:
(f) means for generating a summation signal from said capacitance command signal and said capacitance feedback signal, and wherein said control means (d) is responsive to said summation signal.

16. The control circuit of claim 15 and further comprising:
(g) means for establishing a difference signal from said capacitance command signal and said capacitance feedback signal;
(h) another control means coupled to and being responsive to said difference signal for generating another gating angle command signal;
(i) means for combining said first recited gating angle command signal and said another gating angle command signal into a composite angle command signal; and
wherein said composite angle command signal is applied to said means (b) for controlling firing angle.

17. The control circuit of claim 16 wherein said another control means (h) has a substantially linear signal transfer function.

18. The control circuit of claim 16 and further comprising:
(j) means for scaling said capacitance command signal and said capacitance feedback signal by signal gain factors K and 1−K, respectively, where K is equal to or less than unity, and
wherein said means (f) for establishing a summation signal establishes a summation signal of the scaled capacitance command signal and the scaled capacitance feedback signal.

19. The control circuit of claim 4 wherein said means (c) for establishing a capacitance command signal comprises:
(i) means for establishing a var command signal corresponding to a command for vars; and
(ii) means for converting said var command signal to said capacitance command signal.

20. The control circuit of claim 19 wherein said var generator (a) includes means to inductively load said force commutated thyristor inverter.

21. The control circuit of claim 5 wherein said var generator (a) includes means to inductively load said force commutated thyristor inverter.

22. The control circuit of claim 21 wherein said signal converting means (iii) comprises signal integrator means;
wherein said var signal generating means (iv) includes:
first circuit means responsive to said current signal $I_L$ and said frequency related voltage signal $V_T/\omega$ for generating a frequency related power signal $P_L/\omega$;
second circuit means responsive to said current signal $I_L$ and said frequency related voltage signal $V_T/\omega$ for generating a frequency related var signal $Q_L/\omega$;
third circuit means for converting said frequency related power signal $P_L/\omega$ to another frequency related var signal $Q^*_T/\omega$; and
fourth circuit means for differencing said frequency related var signals $Q_L/\omega$ and $Q^*_T/\omega$ to provide a frequency related var command signal $Q^*_V$; and
wherein said converting means (v) includes fifth circuit means for converting said frequency related var command signal $Q^*_V$ to a capacitance command signal $C^*$.

23. The control circuit of claim 22 wherein said fifth circuit means includes means for providing a signal $V_T^2$ proportional to the square of said voltage signal $V_T$, and means for multiplying said frequency related var command signal $Q^*_V$ by the inverse of the said signal $V_T^2$ proportional to the square of said voltage signal, thereby providing said capacitance command signal $C^*$.

24. The control circuit of claim 3 wherein said predetermined operating characteristic of said var generator comprises a non-linear characteristic and wherein said signal transfer function models at least a portion of said non-linear operating characteristic of said var generator.

25. The control circuit of claim 24 and further comprising:
 (e) means for establishing a capacitance feedback signal corresponding to the capacitance effected by said inverter on said source;
 (f) means for combining said capacitance command signal and said capacitance feedback signal to provide a composite signal, said composite signal being applied to said control means (d);
 (g) means for generating a difference signal between said capacitance command signal and said capacitance feedback signal;
 (h) another control means coupled to said difference signal for generating another gating angle command signal;
 (i) means for summing said first recited gating angle command signal and said another gating angle command signal and providing thereby a summed angle command signal, and
 wherein said summed angle command signal is applied to said means (b) for controlling firing angle.

26. The control circuit of claim 25 wherein said another control means (h) has a substantially linear transfer function between prescribed limits.

27. A method of controlling a static var generator, including a plurality of controlled rectifiers forming a forced commutated inverter coupled to an alternating current source, which method comprises the steps of:
 (a) controlling the firing angle of said controlled rectifiers in response to a gating angle command signal for generating vars;
 (b) establishing a capacitance command signal having a value representative of an equivalent capacitor required at the existing voltage and frequency of said alternating current source to provide a desired level of compensation; and
 (c) generating said gating angle command signal in response to said capacitance command signal.

28. The method of claim 27 and further comprising the step of:
 (d) establishing another capacitance signal corresponding to the effective capacitance of said var generator on said alternating current source; and
 wherein said generating step (c) comprises the step of generating said gating angle command signal in response to both said capacitance command signal and said another capacitance signal.

29. The method of claim 27 wherein said alternating current source supplies current and voltage to a load and said var generator includes a plurality of thyristors; and
 wherein said step (b) for establishing a capacitance command signal comprises the steps of:
 (i) establishing a current signal $I_L$ proportional to the current supplied to the load;
 (ii) establishing a voltage signal $V_T$ proportional to the voltage supplied to the load;
 (iii) converting said voltage signal $V_T$ to a frequency related voltage signal $V_T/\omega$ where $\omega = 2\pi f$ and f corresponds to source frequency;
 (iv) generating a var command signal in response to said current signal and said frequency related voltage signal; and
 (v) converting said var command signal to said capacitance command signal.

30. The method of claim 27 and wherein the controlled rectifiers comprise thyristors.

31. The method of claim 30 wherein said var generator includes means to inductively load the force commutated thyristor inverter.

32. The method of claim 30 further including the step of:
 (d) selectively operating said inverter in leading and lagging modes of operation thereby generating, respectively, leading and lagging vars.

33. The method of claim 32 and further comprising the steps of:
 (a) establishing a capacitance feedback signal corresponding to the effective capacitance of said inverter on said alternating current source; and
 wherein said generating step (c) comprises the step of generating said angle command signal in response to both said capacitance command signal and said capacitance feedback signal.

34. The method of claim 33 wherein said var generator includes means to inductively load the force commutated thyristor inverter; and
 wherein said generating step (c) includes generating said gating angle command signal by modeling at least a portion of the operational characteristic of said var generator.

35. The method of claim 34 wherein said modeling step comprises modeling substantially all of the operational characteristics of said var generator.

36. The method of claim 33 wherein said var generator includes means to inductively load the loaded force commutated thyristor inverter thereby effecting a non-linear operating characteristic thereof.

37. The method of claim 36 wherein said generating step (c) additionally includes (i) establishing a summation signal of said capacitance command signal and said capacitance feedback signal and (ii) generating said gating angle signal in response to the said summatic signal.

38. The method of claim 37 further comprising the steps of:
 (e) establishing a difference signal between said capacitance command signal and said capacitance feedback signal;
 (f) generating another gating angle command signal in response to said difference signal;
 (g) combining said first recited gating angle command signal and said another gating angle command signal into a composite angle command signal; and
 wherein said step (b) for controlling firing angle comprises controlling with said composite angle command signal.

39. The method of claim 38 and further comprising the steps of:

(h) scaling said capacitance command signal and said capacitance feedback signal by signal gain factors K and 1−K, respectively, where K is equal to or less than unity, and wherein said step of establishing a summation signal in accordance with step (c) comprises establishing a summation signal of the capacitance command signal and the capacitance feedback signal following said scaling step.

40. The method of claim 28 wherein said var generator includes a plurality of thyristors and wherein said step (b) for establishing a capacitance command signal comprises:

(i) establishing a var command signal corresponding to a command for vars; and (ii) converting said var command signal to said capacitance command signal.

41. The method of claim 40 wherein said var generator includes means to inductively load the force commutated thyristor inverter.

42. The method of claim 29 wherein said var generator includes means to inductively load the force commutated thyristor inverter.

43. The method of claim 29 wherein said converting step (iii) comprises integratiang said voltage signal;

wherein said generating step (iv) comprises: generating a frequency relatd power signal $P_L/\omega$ in response to said current signal $I_L$ and said frequency related voltage signal $V_T/\omega$; generating a frequency related var signal $Q_L/\omega$ in response to said current signal $I_L$ and said frequency related voltage signal $V_T/\omega$; converting said frequency related power signal $P_L/\omega$ to another frequency related var signal $Q^*_T/\omega$; and differencing said frequency related var signals $Q_{L/\omega}$ and $Q^*_{T/\omega}$ to provide a frequency related var command signal $Q^*_V$; and wherein said converting step (v) comprises converting said frequency related var command signal $Q^*_V$ to a capacitance command signal $C^*$.

44. The method of claim 42 wherein said converting step (v) further includes generating a signal $V^2_T$ proportional to the square of said voltage signal $V_T$ and multiplying said frequency related var command signal $Q^*_V$ by the inverse of the said signal proportional to the square of said voltage signal for providing said capacitance command signal $C^*$.

45. The method of claim 43 further comprising the steps of:

(d) establishing a difference signal between said capacitance command signal and said capacitance feedback signal;

(e) generating another gating angle command signal in response to said difference signal;

(f) combining said first recited gating angle command signal and said another gating angle command signal into a composite angle command signal; and wherein said controlling step (b) comprises controlling firing angle with said composite angle command signal.

46. The method of claim 45 wherein said inverter has a non-linear operational characteristic and wherein said step (c) of generating said gating angle command signal includes modeling at least a portion of said non-linear operational characteristic of said var generator in generating said first recited angle command signal.

47. The method of claim 46 and wherein said step (e) of generating another gating angle command signal includes generating a signal in accordance with a substantially linear signal transfer function.

* * * * *